March 18, 1952    J. E. WEIDENMILLER ET AL    2,589,907
CUTTER FOR BISCUITS AND CRACKER
CUTTING AND EMBOSSING MACHINES Filed Dec. 15, 1949    2 SHEETS—SHEET 1

INVENTORS
JACK E. WEIDENMILLER
ROBERT M. WEIDENMILLER
BY Fred Bing
ATTORNEY

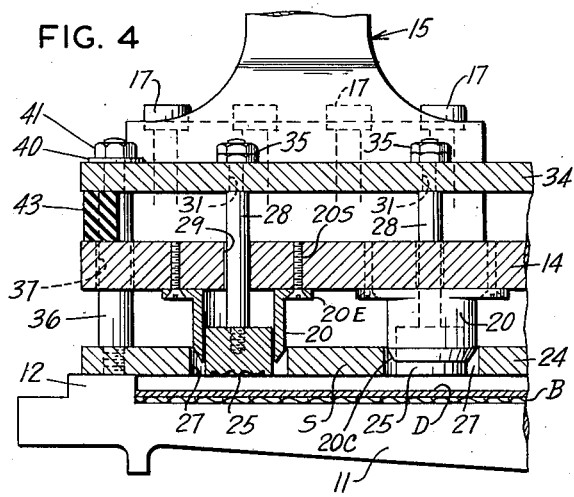
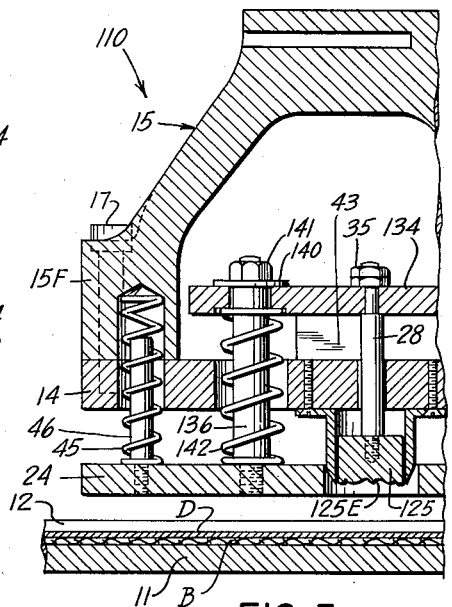
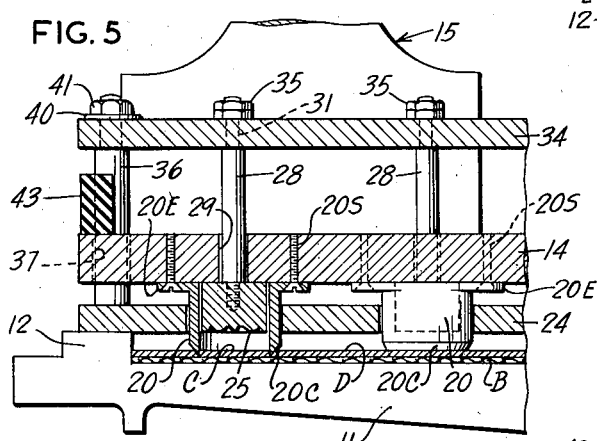
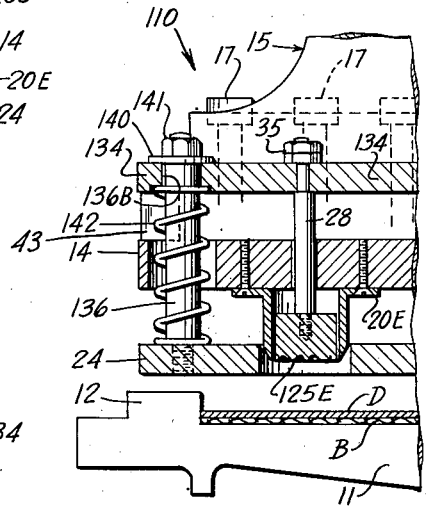
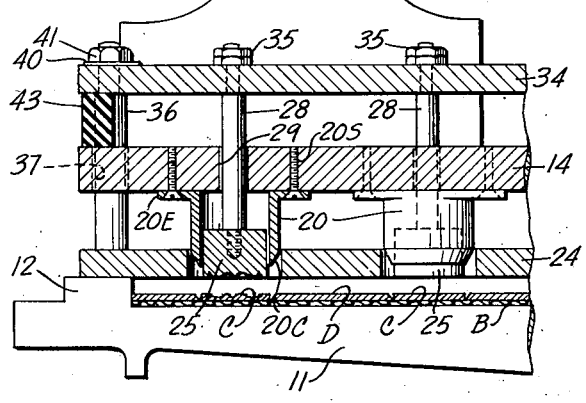

Patented Mar. 18, 1952

2,589,907

UNITED STATES PATENT OFFICE 2,589,907

CUTTER FOR BISCUIT AND CRACKER CUTTING AND EMBOSSING MACHINES

Jack E. Weidenmiller, Lincolnwood, and Robert M. Weidenmiller, Skokie, Ill., assignors to Edward Weidenmiller Co., Inc., Morton Grove, Ill., a corporation of Illinois Application December 15, 1949, Serial No. 133,123

2 Claims. (Cl. 107—26)

This invention relates to cutters for crackers, cookies and the like, and particularly to such cutters of the kind that are used in cookie and cracker cutting and embossing machines in relatively large bakeries.

In such cracker and cookie cutting and embossing machines, a continuous sheet of dough is advanced on a belt through a cutting station in the machine at which a vertically reciprocable cutting or forming die is moved up and down at a relatively rapid rate so as to cut a relatively larger number of crackers or cookies in each vertical movement of the cutting die. Where such machines are used for forming embossed crackers or cookies, a two-cycle cutting and forming operation is in some instances utilized wherein an embossed pattern is placed upon the dough at one position of the sheet and in which the crackers are cut in the next station or position. Still further, such embossing and cutting machines may, in some instances, be arranged to afford an embossed cracker or cookie through the performance of cutting and embossing operations at the same position of the dough sheet. The present invention relates to all of these types of cutting and forming devices, and in particular it is the primary object of the present invention to enable such cutters to be so constructed and arranged that the cleaning of the cutters and the related structure is materially simplified.

In such cutters as heretofore constructed, the cutting dies have been mounted on a bolster block and have been associated with a stripper plate in such a manner that the internal surfaces of the structures have embodied a large number of concealed or inaccessible corners and recesses that could not be reached conveniently for attainment of a proper cleaning operation, and it will be recognized, of course, that in the production of crackers, cookies and the like, the various materials tend to accumulate on the machinery and that it is essential that proper cleaning of the apparatus be attained. More specifically, it is an object of the present invention to enable the bolster plate in such cutters to be formed with relatively smooth upper and lower surfaces and to relate the bolster plate to the other elements of the apparatus that these surfaces may readily be reached by cleaning means such as steam jets and the like. A further and related object of the present invention is to simplify the support of the cutting apparatus in the cutting machine and to enable this to be accomplished in such a way that breakage of the supporting elements is avoided.

In prior cookie and cracker cutters, the bolster plate has been supported on the reciprocating head of the cutting machine by means of connecting or supporting arches, and these arches as heretofore employed have been of such a character that the arches have been subject to frequent breakage, and to enable this to be avoided is an object of the present invention. A further and related object is to enable the supporting arches in a cracker or cookie cutter to serve as a housing for portions of the return springs that are used in the cutters for returning the stripper plate to its lowermost position.

Another and more specific object of the present invention is to simplify the formation of the various elements that are utilized to make up a cracker or cookie cutting apparatus, and to enable most of the drilling operations that must be performed in the manufacture of such apparatus to be performed while all of the plate elements, that is, the knockout or embossing plate, the bolster plate or block and the stripper plate, are held in a single clamping fixture.

Other and further objects of the present invention will be apparent from the following description and claims and are illustrated in the accompanying drawings, which, by way of illustration, show preferred embodiments and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings:

Figs. 4, 5 and 6 are sectional views taken along the line 4—4 of Fig. 2, and showing the parts in different positions;

Fig. 7 is a view similar to Fig. 3 and showing an embossing cutter embodying the invention; and Fig. 8 is a view similar to Fig. 4 and showing the cutter of Fig. 7.

Figure 1:
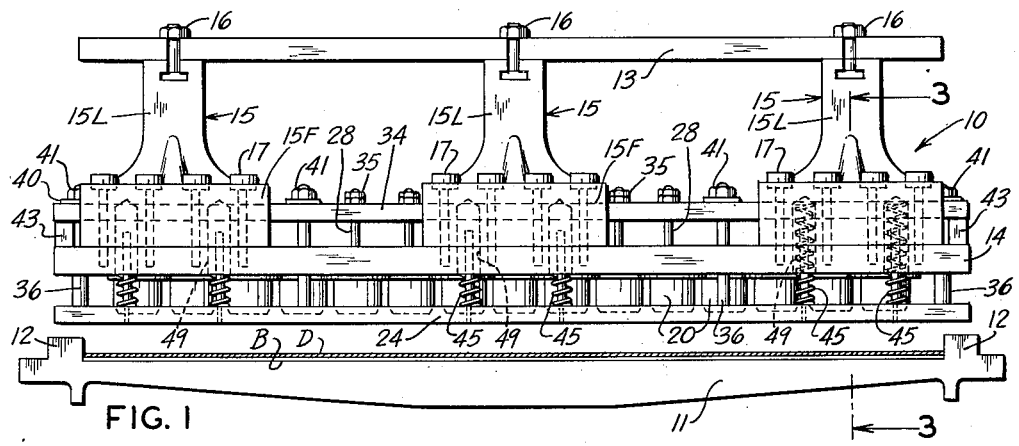
Fig. 1 is a front elevational view of a cutter unit embodying the invention.

For purposes of disclosure, the invention is herein illustrated in Figs. 1 to 6 as embodied in a cutting unit 10 adapted for performance of cracker cutting operations, and in Figs. 7 and 8 as embodied in an embossing and cutting unit 110 which not only cuts crackers or cookies from a dough sheet but also embosses a pattern on the upper faces of such crackers or cookies. Both of the units 10 and 110 embody basic elements that correspond in name and general function with elements embodied in prior cutters, and it should be observed that the present invention resides in the form, construction and relationship of these elements as will be described in detail after the various elements have been identified and described in a general manner. Both forms of the invention are adapted for mounting and use in the same type of conventional machine in which a cutting bed plate 11 is arranged to have a dough sheet D drawn or advanced longitudinally thereof on an endless belt B between spaced striker bars 12 that are afforded along opposite sides of a cutting and forming station in the machine. Such cutting and forming station is, in such conventional machines, defined in part by a vertically reciprocable horizontal mounting bar 13 which serves to support and operate the forming means, such as the cutting unit 10.

The units 10 and 110 are in many respects similar in form and construction, and by reason of the novel form and relationship of their elements, the units 10 and 110 have the same advantages insofar as strength, economy of manufacture and ease of cleaning may be concerned. Considering first the novel construction and arrangement of the unit 10, it will be observed the unit 10 embodies a rectangular bolster plate 14 that is supported on and beneath the bar 13 by a plurality of mounting arches 15 that are connected at their upper ends to the bar 13 by means such as bolts 16. The arches 15 are disposed at points spaced longitudinally of the bolster plate 14, and each arch 15 comprises a horizontal upper bar portion 15T, from the ends of which force transmitting legs 15L extend downwardly and outwardly so as to terminate in enlarged connecting feet 15F that are disposed over and adjacent to opposite border or side edge portions of the bolster plate 14 to which such connecting feet 15F are respectively secured by a plurality of Allen head cap screws 17 that extend downwardly through the feet 15F and into tapped relation with the bolster plate 14.

The lower face of the bolster plate 14 serves as a support for a plurality of downward extending cutters 20 that are distributed about the lower surface of the bolster plate 14 in spaced relation to the ends and side edges of the plate. The cutters 20 are shaped in plan-form so as to produce crackers or the like of the desired shape, and as herein shown are generally circular in plan-form. Each cutter 20 has a continuous side wall which at its upper end bears against the lower face of the bolster plate 14, and integral attaching ears 20E extend from opposite sides of the cutter at the upper edge thereof so that screws 20S extended upwardly through such ears may serve to hold the cutter in position. The lower edge of the wall of each cutter 20 is tapered to a sharp lower cutting edge 20C. Thus, when the bolster plate 14 is moved downwardly through its operating stroke, the cutters 20 are effective to cut the dough sheet D to form crackers C, as shown in Figs. 5 and 6.

It is, of course, essential that the dough sheet D and the cut crackers C be held against upward movement with the cutters 20, and for this purpose a lower stripper plate 24 and internal strippers 25 are provided. The stripper plate 24 is in the form of a rectangular plate of the same shape and size as the bolster plate 14, and openings 27 are formed in the stripper plate 24 through which the respective cutters 20 may extend and move in relatively closely spaced relation. The internal strippers 25 are disposed within the respective cutters 20 in closely spaced relation to the inside surfaces of the walls of the cutters. The internal strippers 25 are supported so that their lower surfaces are in the same plane as the lower face of the stripper plate 24, and in accomplishing this, each internal stripper 25 has an upwardly extended supporting bolt 28 fixed thereto and which is slidably extended through a clearance bore 29 formed in the bolster plate 14. Above the bolster plate 14, each bolt 28 has its shouldered and reduced upper end extended through a related opening 31 formed in a knockout plate 34. A nut 35 is threaded onto the upper end of each bolt 28 to fix the same to the knockout plate 34. This knockout plate 34 is of a length equal to that of the bolster plate, but in width, the knockout plate 34 is arranged to fit between the inner sides of the feet 15F of the arches 15, as shown in Figs. 2 and 3.

The knockout plate 34 and the stripper plate 24 are, in turn, connected together so as to move in unison, and for this purpose a plurality of connecting studs 36 have their lower ends shouldered, and threaded into the stripper plate 24, and these studs extend upwardly through bores 37 in the bolster plate 14. The upper ends of the studs 36 are shouldered and reduced, and are extended through bores 39 in the knockout plate 34, and washers 40 and nuts 41 on the extended and threaded upper ends of the studs 36 serve to hold the knockout plate 34 in position on the studs 36.

Figure 2:
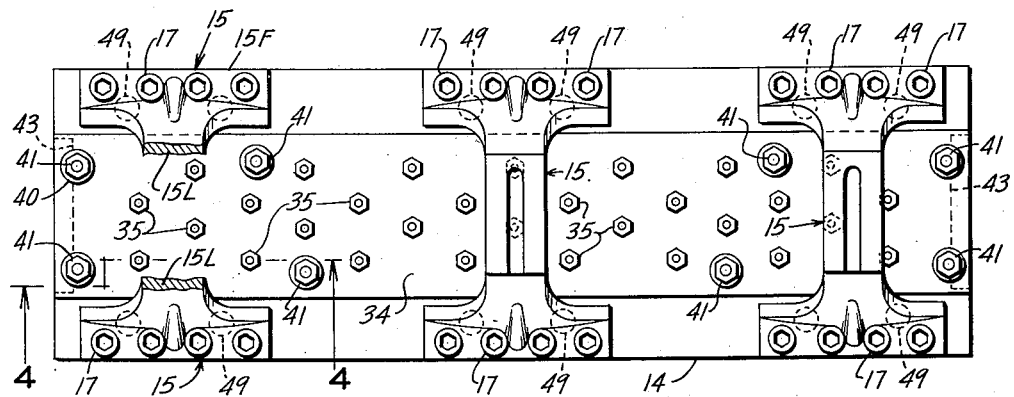
Fig. 2 is a plan view.
Figure 3:
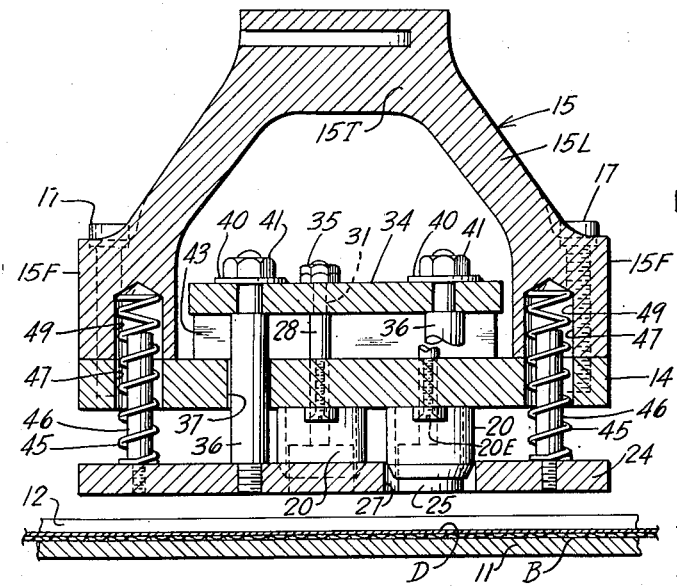
Fig. 3 is a sectional view taken along the line 3—3 of Fig. 1.

The lowermost position of the stripper plate 24 is determined by engagement of the ends of the knockout plate 34 with resilient bumper strips 43 carried on the upper surface of the bolster plate 14, as shown in Figs. 1, 2 and 3, and the stripper plate 15 is urged toward this relation by spring means. Thus, as will be evident in Figs. 1 to 3 of the drawings, two expansive coil springs 45 are provided in the area covered by each foot 15F of each arch 15, and these springs 45 are respectively mounted in surrounding relation to guide studs 46 that extend upwardly from the stripper plate 24. In order to afford an efficient length in the springs 45, these springs are extended upwardly through bores 47 in the bolster plate 14 and into bores 49 that extend upwardly into the feet 15F of the arches 15, such bores 47 and 49 affording downwardly facing pockets so that the upper ends of the springs 45 are disposed in part within the feet 15F of the arches 15. The springs 45 act, of course, to urge the stripper plate 24 and the knockout plate 34 to the lower relation that is determined by the pads or bumper strips 43.

In operation, the downward movement of the bar 13 shifts the unit 10 downward from the position of Figs. 1 and 3, and in the course of such downward movement the ends of the stripper plate 24 strike the striker bars 12, as shown in Fig. 4, so that in the continued downward movement of the bar 13, the cutters 20 move out of their retracted positions of Fig. 4 and into their projecting cutting positions of Fig. 5, thereby to cut crackers C from the dough sheet D at the lower end of the cutter stroke. In the retracting movement of the bar 13, the strippers 25 and the stripper plate 24 remain in their lower positions of Fig. 6 while the bolster plate 14 and the cutters 20 move upwardly, thereby to retract the cutters 20 and cause stripping of the crackers C and dough sheet D in the event of sticking of the dough to the cutters.

In the unit 110, the internal members 125 within the cutters 20 are utilized as embossing members and have embossing surfaces 125E on their lower surfaces, and such members 125 are arranged for embossing movements independently of the stripper plate 24. Thus, the members 125 are connected by bolts 28 to an embossing plate 134 which in its form is substantially similar to the plate 34. However, the plate 134 is associated with the stripper plate 24 in a somewhat different manner. Thus, studs 136 are fixed to the stripper plate 24 and extend upwardly and slidably through bores 136B in the embossing plate 134, and washers 140 and nuts 141 are fixed on the upper ends of the studs 136. Springs 142 surround the studs 136 and act between the plates 24 and 134. Rubber bumpers 43 are provided, as in the unit 10, so that the parts tend to move through the same cycle as described with respect to the unit 10. However, the embossing plate 134 may in this instance be independently actuated in the conventional manner to produce the desired embossing action.

In attaining the objectives of the present invention, the bolster block or plate 14, the stripper plate 24 and the knockout plate 34 or its counterpart, the embossing plate 134, are all made from flat-surfaced, rolled metal plates of rectangular form, and because of this, the surfaces of these plates may be readily and easily cleaned by conventional means such as steam jets. Moreover, the bolster plate or block 14 is made from steel so that the requisite strength in the bolster plate is attained by the use of a plate of relatively small thickness, and this contributes to the attainment of adequate spacing between the several plates so as to simplify the cleaning operations. In this respect, of course, it will be evident that the complete unit 10 or 110 must have a maximum overall vertical dimension that is determined by the design of commercial cracker and cookie cutting machines. Thus, in combination with the relatively thin bolster plate or block 14, the mounting arches 15 have, under the present invention, been formed and arranged so that the legs 15L extend downwardly from the top bar 15T of the arches at a relatively small angle from the vertical, and the lower ends of the legs 15L merge with the top surfaces of the vertically extended feet 15F so that the downward forces are transmitted efficiently and without excessive bending or shearing forces that might tend to cause failure of the arches 15. Furthermore, the relatively large vertical distance that has been afforded in the present units between the top of the bolster plate or block 14 and the tops of the arches 15 enables the feet 15F to have a relatively great vertical dimension, and hence the spring retaining pockets 49 may be afforded within the several feet 15F.

The strength requirements of the stripper plate 24 and the knockout plate 34 or embossing plate 134 may, of course, be met by a material such as rolled bronze, and since this material is more easily workable, we prefer to use it, particularly in the stripper plate 24 where machining of the openings 27 may in some instances be complicated as to form. Regardless of the specific material employed in such plates, it is to be observed that the major portion of the drilling and tapping operations on the several plates of any particular cutter are performed on common centers so that the layout and the drilling and tapping operations are simplified to a marked degree.

From the foregoing description it will be evident that the present invention materially simplifies the production as well as the upkeep and cleaning of cracker and cookie cutting and embossing units. More specifically, it will be clear that the present invention affords mounting arches in such cutters that will not tend to crack or break in use, and that the cutting unit may be effectually cleaned by reason of the smoother and more conveniently accessible surfaces that are afforded in the unit.

We claim:

1. In a cutting unit of the character described having a cutter-carrying bolster block and a stripper plate supported beneath the bolster block in surrounding relation to the cutters and for limited downward movement relative to the bolster block, the combination of a plurality of mounting arches each comprising an elongated upper connecting portion, legs extended downwardly and outwardly from opposite ends of said upper portion and vertically elongated connecting feet at the lower ends of said legs, said feet being engaged with said upper surface of said bolster block at the opposite edges thereof and the space between said legs affording a clearance space extended along the top of said bolster block, said arches being spaced longitudinally of and being fixed to said bolster block, said bolster block and said feet having upwardly extending pockets formed therein, and a plurality of springs acting at their lower ends against said stripper plate and disposed at their upper ends in said pockets in said block and said feet to urge said stripper plate downwardly relative to said bolster block.

2. A cutting unit as defined in claim 1 in which said bolster block and said stripper plate are formed from flat metal plates affording flat upper and lower surfaces that may be readily cleaned.

JACK E. WEIDENMILLER.
ROBERT M. WEIDENMILLER.

REFERENCES CITED

The following references are of record in the file of this patent:

UNITED STATES PATENTS

| Number | Name | Date |
| --- | --- | --- |
| 1,419,276 | Lentz | June 13, 1922 |
| 1,660,553 | Greene et al. | Feb. 28, 1928 |
| 2,153,067 | Alltimes | Apr. 4, 1939 |

FOREIGN PATENTS

| Number | Country | Date |
| --- | --- | --- |
| 275,123 | Great Britain | July 22, 1927 |